United States Patent [19]

Dvorak

[11] 4,451,322
[45] May 29, 1984

[54] APPARATUS FOR FORMING STRUCTURAL SHEETS FROM FIBROUS BIOLOGICAL WASTE

[75] Inventor: Bolek Dvorak, Calgary, Canada

[73] Assignees: Richard A. Moerman; Barry Sullivan, both of Calgary, Canada

[21] Appl. No.: 371,212

[22] Filed: Apr. 23, 1982

[51] Int. Cl.³ .............................. B30B 7/00; B29J 5/00
[52] U.S. Cl. .................................... 156/461; 100/93 P; 100/139; 100/185; 100/187; 156/202; 156/324; 156/463; 156/467; 156/555; 425/308; 425/404
[58] Field of Search ............. 156/585.1, 324, 200-202, 156/461, 463, 464, 467; 100/92, 93 N, 93 P, 137-139, 179, 185, 187, 245; 242/68.7; 425/308, 404

[56] References Cited

U.S. PATENT DOCUMENTS

| 3,185,614 | 5/1965 | Van Hartesveldt | 100/93 P X |
| 3,367,094 | 2/1968 | Harwig | 100/139 X |
| 3,582,010 | 6/1971 | Whiteman | 242/68.7 X |
| 3,657,055 | 4/1972 | Nichols | 100/93 P X |
| 3,671,355 | 6/1972 | Paymal | 156/324 |
| 4,025,278 | 5/1977 | Tilby | 100/137 X |

*Primary Examiner*—David A. Simmons
*Attorney, Agent, or Firm*—C. Michael Zimmerman

[57] ABSTRACT

The apparatus accepts dry stripped crude fiber such as straw or sugar cane wastes, coconut husks, or elephant grass, compacts them into a relatively dense sheet, and bonds a strong surfacing material such as a heavy paper to the faces and edges. The sheet, continuously flowing from the apparatus, is cut into standard lengths and the cut ends are capped with the same surfacing material. A precompactor near the end of an entrance chute into the apparatus uniformly predensifies the incoming fiber prior to its compaction by means of a ram. The ram is carried on roller bearings especially adapted to withstand the weight and other forces associated with the continuous movement of the ram. The compacted material is continuously propelled by the ram and enters a press, where heat and pressure produce a dimensionally stable sheet bonded together partially by natural resins released from the fibers by the heat, and partially by mechanical interlinking between fibers. In the following operation, the sheet is covered with the surfacing material, which is successively folded over and bonded to the edges of the sheet. The surfacing material, provided in discrete rolls, is continuously available from a feeder station which facilitates the substitution of a fresh roll as the material is consumed. In the following sawing and end sealing operations, fully surfaced sheets of standard lengths are produced.

29 Claims, 8 Drawing Figures

APPARATUS FOR FORMING STRUCTURAL SHEETS FROM FIBROUS BIOLOGICAL WASTE

BACKGROUND OF THE INVENTION

The invention of the present application relates generally to the field of architectural structural materials and their fabrication, and also to the field of efficient utilization of crude fibrous waste products of the agricultural and forestry industries. More particularly, the invention is concerned with an apparatus for efficiently manufacturing from such crude and plentiful sources as waste sugar cane, various kinds of straw such as the stalks of cereal grains or virtually any other source of crude plant fiber, a versatile, durable and relatively inexpensive sheet of considerable utility in the construction of dwellings and other buildings.

Fundamentally, the process involved in converting such waste products into useful building products involves the preparation of the fibrous material by breaking it down into multifibrous strands of a substantially uniform size, while various impurities are removed, drying it until its moisture content is not more than about %15 by weight, and finally compacting it into a relatively dense mass of the desired shape and size.

Such processes frequently involve the application of considerable heat and pressure, such that the resulting product can have a surprising density and strength, due to the considerable mechanical interlocking of the individual fibrous strands, and also due to the release of natural bonding resins present in the fibers. The resulting compacted mass can be used for certain purposes, but it is more often further improved and suited to particular structural purposes by having a layer of some sort of surfacing material bonded to its faces and edges. For this purpose, any one of a number of materials such as heavy papers of high tensile strength may be securely bonded to the surfaces of the sheet during the manufacturing process by the use of various adhesives.

The compacted sheet with whatever surfacing material is selected for a particular purpose forms an inexpensive composite structural material which can serve as a ceiling or wall board or, especially at lower compaction densities, can be employed as a thermally insulative layer, or as a material useful in acoustic absorption or isolation. The material can with suitable treatments be rendered fire-resistant, and resistant against rot, mildew or insect infestation.

In order to realize the significant advantages of such a material, manufactured as it is from crude fiber sources which would otherwise be wasted, it is necessary that the manufacturing apparatus be of a sort which can be readily located near the source of the fiber, since the shipment of the requisite large quantities of waste to a distant factory would be prohibitively expensive. Further, the apparatus should be easily set up at the site of the fiber source, and similarly easily taken down when the source of fiber has been exhausted, all without requiring more than a minimum of special engineering skills or an excess of labor.

In this regard, it may be mentioned that the known apparatuses for producing compacted structural members from crude fiber sources required considerable time and skill in setting them up on site. It must be remembered that such an apparatus can perhaps be of greatest utility in areas of the world that are mostly agrarian, and which may be expected to lack some of the facilities and skilled labor that are plentiful in the heavily industrialized regions.

Apparatuses of the general type under consideration here have existed for some time, and have been able to produce a variety of construction-grade materials more or less successfully. However, each of these prior-art apparatuses has suffered from one or more of a variety of faults, some of which affected the consistency of the product, while others were more related to the efficiency, reliability and cost of the apparatus.

As noted earlier in this application, the crude fiber must be prepared for its role by being stripped, dried as necessary, and separated from any of the grosser impurities such as rocks and gravel, etc. The resulting fibrous mass has a low density before compaction, and also has an inconsistent density, since portions will be clumped and intertwined together, while others consist mostly of loose strands. Typically, the fibrous material is transported into the apparatus by being moved along a continuous conveyor. Consequently, the material arriving at the input to the apparatus from the conveyor has such an inconsistent density that some means of precompaction is highly desirable.

Upon entering the manufacturing apparatus after leaving the conveyor, the fibrous waste matter is compacted in small amounts by a continuously moving reciprocating ram of considerable weight. The ram not only increases the density of the fibrous matter very considerably but also, in combination with a cutting blade, shears away excess material and propels the material through the entire operation. Each stroke of the ram gathers, compacts, and shears a portion of the fibrous matter, and propels it into a tunnel having the cross-sectional shape of the finished product. Within the tunnel, the same portion is further compressed against compacted material deposited there from preceding ram strokes, and the entire compacted mass is prevented from springing back in the direction of the retreating ram by a series of "gill plates" in the walls of the tunnel.

The ram which accomplishes this compaction must move continuously during the operation of the equipment, and is subjected to considerable loading. Consequently, it must be supported upon bearings which are subjected to high forces and which must perform reliably and with minimum friction over a long lifetime. The design and arrangement of such bearings must reflect the role they are to perform in the apparatus, and must especially be carefully selected to cope with the weight of the ram.

Since the motive force of the ram serves as the only means of transporting the compacted material through the apparatus, minimizing frictional losses throughout the path of travel of the compacted sheet is as important in the conservation of energy as the design of the ram bearings. In particular, the compacted material after its formation passes through a press which subjects it to considerable heat and pressure to ensure dimensional stability, such that the material becomes a continuous sheet of predetermined dimensions.

This sheet next passes into a surfacing operation in which its faces and edges are covered with a bonded surfacing material. Heat and pressure are again employed to firmly bond the surfacing material to the sheet. In this operation, energy losses due to friction can be significant without adequate means to control the length over which the bonding heat and pressure are applied. Moreover, the quality and consistency of the product could be improved with better control of the application of pressure to the compacted sheet during the surfacing operation.

In the surfacing operation, a surfacing material which may be a heavy paper of high tensile strength is firmly bonded to each of the faces of the compacted sheet. Consequently, the surfacing material is in reality applied from one source to cover the top of the compacted sheet, and from another source located below the moving sheet, to cover the bottom of the sheet. The surfacing material is typically supplied in the form of large heavy rolls, which must be removed and replaced as they are exhausted. In prior art apparatuses of this sort, the exhaustion of the current roll of surfacing material was the occasion for shutting down the apparatus at least daily in order to permit workmen to remove and replace the exhausted rolls. Obviously, an expensive apparatus of the sort under consideration here needs to be kept in operation substantially continuously if maximum economy and efficiency are to be achieved.

As noted above, the surfacing material is separately applied to the upper and lower faces of the moving compacted sheet in substantially a single operation at a single location along the production line. Typically, the surfacing material is a heavy paper which is supplied without an adhesive layer, and must be coated with an adhesive, such as a thermosetting resinous glue immediately prior to its application to the compacted sheet. The surfacing material is provided in a width which is sufficient to fully cover each face of the sheet with sufficient surplusage to permit folding the excess over each edge of the sheet to which the surfacing is then also bonded. While it might seem desirable to accomplish these operations simultaneously on both the top and bottom faces of the sheet, in practice the complications to the apparatus and a tendency to accumulate glue in the portions used to accomplish the edge bonding have made a different solution necessary.

SUMMARY OF THE INVENTION

The principal object of the present invention is the provision of an apparatus for manufacturing a structurally strong, firmly compacted sheet from loose fibrous biological waste;

A second object of the present invention is the provision of such an apparatus having maximum efficiency, economy and reliability of operation, together with optimum consistency of the manufacturing product;

A third object of the present invention is the provision of such an apparatus which can be maintained in operation substantially continuously, without need for shutting down at frequent intervals in order to renew the supply of sheet surfacing material;

A fourth object of the present invention is the provision of such an apparatus with a means of precompacting the incoming fibrous matter prior to its compaction in the apparatus;

A fifth object of the present invention is the provision of such an apparatus having an improved surfacing operation for bonding a surfacing material to the compacted sheet of fibrous matter;

A sixth object of the present invention is the provision in such a surfacing operation of improved means of controlling the extent over which heat and pressure are applied to the compacted sheet in bonding the surfacing material thereto;

A seventh object of the present invention is the provision in such a surfacing operation of improved means to bond surfacing material to the edges of the sheet of compacted material;

The above and other objects of the present invention are achieved in an apparatus which will be described in considerable detail in the following sections of this application. However, the means of accomplishing the improvements which characterize the present invention may be summarized as follows:

The loose fibrous matter which forms the raw material in the process of this invention is transported into the apparatus proper by means of a continuously moving conveyor. At the outlet of the conveyor, a chute conducts the material downwardly to the face of the ram. Near the outlet of the chute, a plurality of reciprocating plungers alternately move into and out of the chute along paths of motion nearly aligned with the axis of the flow path from the chute to the ram, precompacting the entering material such that it has a more nearly uniform and higher density when would exist without such precompaction.

The ram itself is supported upon a ram bed by sets of roller bearings and a bearing rail, against which the roller bearings are engaged to support the weight and other loads associated with the reciprocating movement of the ram. Each pair of roller bearings consists of a weight-bearing roller paired with a guide roller mounted on a bearing block to support and guide the ram without substantial friction. The position of the bearing block can be adjusted to control clearance between the rollers and bearing rail by means of a tapered gib. The weight-bearing roller and the corresponding bearing surface on the bearing rail are angled more nearly toward the horizontal than are the guide roller and its corresponding bearing surface, such that the downwardly directed gravitational force is better resisted.

The surfacing material is bonded to the sheet following its formation and pressing at a portion of the apparatus known as the gluing table. During the surfacing operation, a liquid glue is applied to the surfacing material, which is then bonded to the surface of the compacted sheet with heat and pressure. The surfacing of the top and bottom of each compacted sheet is carried out in this operation, using separate rolls of the surfacing material, one located above the sheet and the other below.

Following the application of surfacing material to each of the surfaces of the sheet, the surfacing material is bonded by compressing the surfaces of the sheet between the table and an upper plate located immediately above the table and supported upon a pantograph support assembly which ensures that its movement is along an axis normal to the plane of the table. The upper plate can be adjustably angled with respect to the table to vary the length of the portion of the compacted sheet which is subjected to the bonding heat and pressure.

The surfacing material is provided in a width slightly greater than the width of the compacted sheet to permit folding the surplusage over the edges of the sheet, to which it is then bonded to provide full coverage of the sheet. The apparatus is simplified and its operation with respect to this edge bonding is improved by the provision that the upper and lower layers of surfacing material are not applied at the same point on the moving compacted sheet, but are rather offset.

Since the surfacing material is consumed throughout the operation of the apparatus, the continuous operation of the apparatus requires that there be a means for renewing the supply of surfacing material for both the upper and lower surfaces of the sheet. This need is accommodated by providing a ready reservoir of fresh rolls of surfacing material near the point at which the surfacing material is fed into the apparatus. A pair of such rolls are also accommodated at the point of feeding into the apparatus, such that either can be used as a supply during operation. The flow is not interrupted when one of these rolls has been exhausted, since the lead end of the fresh roll can be quickly connected to the end of the surfacing material on the exhausted roll, and once the exhausted roll has been removed, a replacement roll is readily brought into position from the reservoir.

The above and other features, objects and advantages of the present invention, together with the best mode contemplated by the inventor thereof for carrying out his invention, will become more apparent from a reading of the following description of a preferred embodiment of the invention and from a consideration of the drawing of this application, in which the various figures show the following:

DETAILED DESCRIPTION OF A PREFERRED EMBODIMENT

Figure 1:
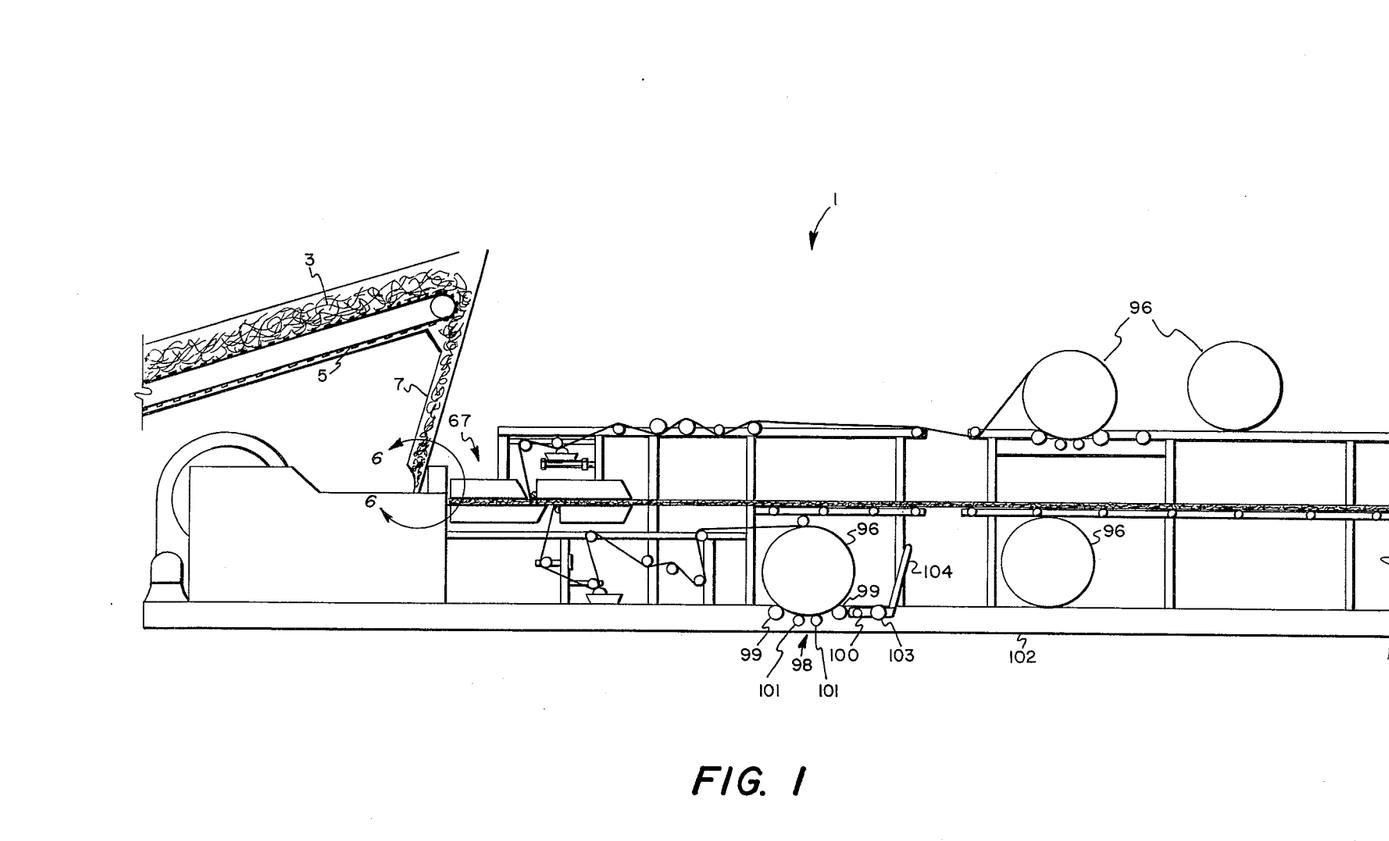
FIG. 1 is a side view partially in schematic cross-sectional form of an apparatus for producing compacted sheet from loose fibrous matter according to the present invention.

In FIG. 1 an overall view of a major portion of the compacted sheet forming apparatus 1 according to the present invention is shown. FIG. 1 shows the apparatus up to the point at which a continuously moving sheet of compacted matter covered on all sides with a surfacing material has been formed. The subsequent cutting of this sheet into desired lengths and the capping of the cut ends, neither of which forms a part of the present invention, will be described with respect to FIG. 8.

Fibrous matter 3 to be compacted enters apparatus 1 at the left from a bin (not shown) of such material. The source of fibrous matter 3 may be, for example, the pressed and dried stalks of sugar cane or any other vegetable fiber such as straw. Prior to being compacted in apparatus 1, this fibrous matter will have been dried sufficiently that its moisture content is less than %15 by weight, will have been stripped or broken down into small fibrous strands of a substantially uniform diameter, and will have had most dirt or other impurities removed.

A conveyor 5 serves to transport the fibrous matter into a chute 7 which leads downwardly into the compactor portion of the apparatus. As will be readily appreciated, the fibrous matter entering chute 7 after having been transported up a conveyor and dropped through several feet down chute 7, will be more or less in a loose form having a rather low but also inconsistent density. Since the ram compaction operation which follows operates upon a fixed small volume of the matter present at the bottom of chute 7 with each ram "bite", it is highly desirable that the fibrous matter present at the bottom of chute 7 have a uniform density.

Figure 2:
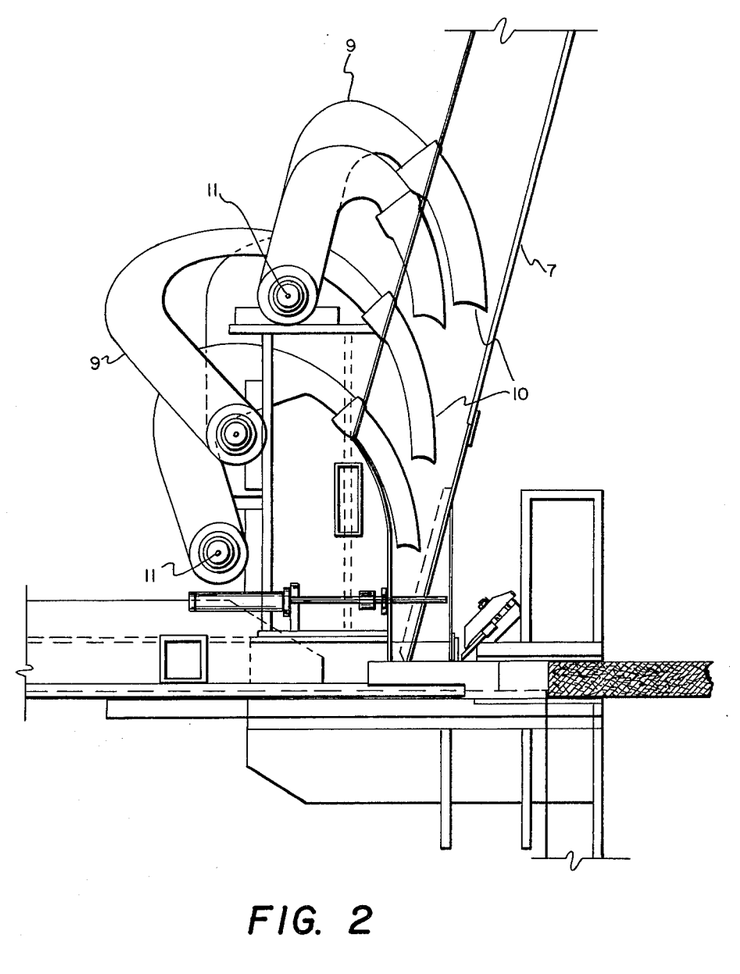
FIG. 2 is a side view partially in section showing details of a precompactor according to the present invention.

In FIG. 2, details of a precompacting apparatus for securing such a uniform consistency at the outlet of chute 7 are shown. A precompactor for loose fibrous matter according to the present invention consists of a plurality of arcuate plungers 9 which are serially arrayed along the flow path of fibrous matter 3 as defined in the present instance by chute 7. Although any desired number of such plungers may be employed according to the width of the chute 7, only four have been illustrated in FIG. 2 for the sake of clarity.

In general, each of three driving shafts 11 will have a plurality of such plungers 9 spaced along its length and fixed to the shaft. Each of these plungers will of course operate in unison with all of the other plungers on the same shaft, but each may be rotationally oriented about the axis of the shaft slightly differently from its neighbors in order to improve the compacting effect.

To the same end, driving shafts 11 may desirably be operated asynchronously with one another that not all of plungers 9 move into and out of chute 7 simultaneously. In a preferred form, the upper and lower shafts 11 were operated synchronously, or in unison, while the middle shaft in FIG. 2 was driven in phase opposition to the other two shafts, such that it was withdrawn from chute 7 at the same time that the upper and lower shafts were moving into chute 7.

In any case, the motion of each plunger is reciprocating, along a path between a first position in which it is withdrawn or at least partially withdrawn from chute 7, and a second position in which it is driven into the interior of chute 7 through a slot-shaped aperture or hole in the wall of chute 7.

In its transit from the first to second position above, each of the plungers moves along an arcuate path in a direction to compact loose fibrous matter in its path and urge the matter toward the face of the ram located below the chute outlet. As a result, the fibrous matter is given a greater and more uniform density, and the quantity separated by the ram from the matter in the chute for compaction is more nearly a uniform amount with each ram bite.

Each of plungers 9 is provided with a retractile, spring-loaded tip 10 at its end projecting toward and into chute 7. Each of these tips 10 thus defines a certain level of axial stress beyond which the tip will telescope or withdraw in a direction along the shaft of plunger 9. Consequently, a more uniform level of compaction is achieved, and obstructions which might occasionally develop within chute 7 will not result in severe stresses on plungers 9.

The employment of reciprocating motion in precompaction offers a number of advantages among which are the fact that only relatively small holes need perforate the side of chute 7 to permit the movement of plungers 9 into and out of the flow path of fibrous matter 3. In prior art designs employing rotating plungers, long slots were required to permit the compactor blades to rotate completely through the wall of chute 7. In consequence of these long slots and the nature of the prior art compactor movement, much material was drawn through the slot itself and was a source of lost fiber as well as a cleanup problem.

Figure 3:
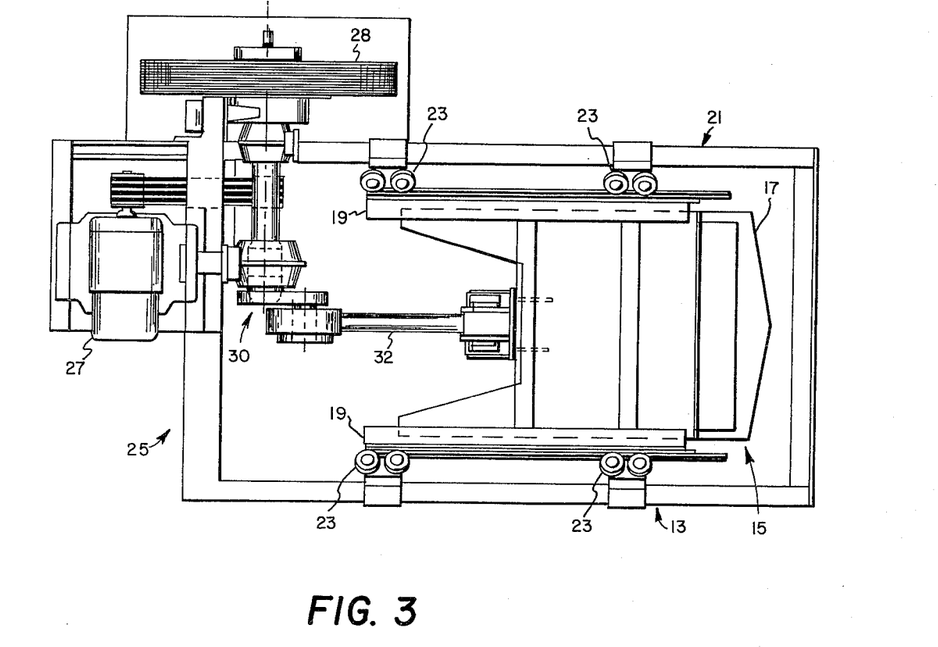
FIG. 3 is a top view showing a ram together with its drive mechanism and bearings according to the present invention.

Considering now FIGS. 2 and 3, the arrangement and functioning of the ram in the present invention will be more thoroughly considered. As will be readily understood, the ram forms the heart of the first phase in the formation of structurally strong compacted sheet from loose fibrous matter, because it compacts the incoming fiber in small amounts and rams it through a forming means which shapes the aggregate of these small compacted amounts into a dense sheet flowing to the remaining portions of the manufacturing process. This sheet moves in a somewhat jerky, spasmodic manner as each stroke of the ram advances the sheet continuously along the sheet flow path through the entire apparatus.

In FIG. 3, a compactor assembly 13 according to the present invention includes a large heavy ram 15 shown as it would be seen if viewed from above. Ram 15 is typically an assemblage of standard structural steel shapes including a ram body 17 formed of steel plate and a pair of edge rails 19 of square steel tubing, the whole being typically welded together.

A ram bed 21 similarly formed of structural steel welded together serves as a frame which not only supports ram 15 upon a set of bearings 23, but also serves as a common mounting base for a reciprocating drive assembly 25. An electric motor 27, for example a 50 hp A.C. induction motor, drives through a system of belts and sheaves a large flywheel 29, which is in turn coupled through a compressed-air-operated clutch to a crankshaft 31 and connecting rod 33 to drive ram 15 in a reciprocating motion. Such ram 15 not only compacts incoming fibrous matter but also shears away the excess matter as will be discussed later in connection with FIG. 6, the forces involved with the support and movement of ram 15 are considerable and, in combination with an often dirty environment, subject bearings 23 to considerable stress.

Figure 4:
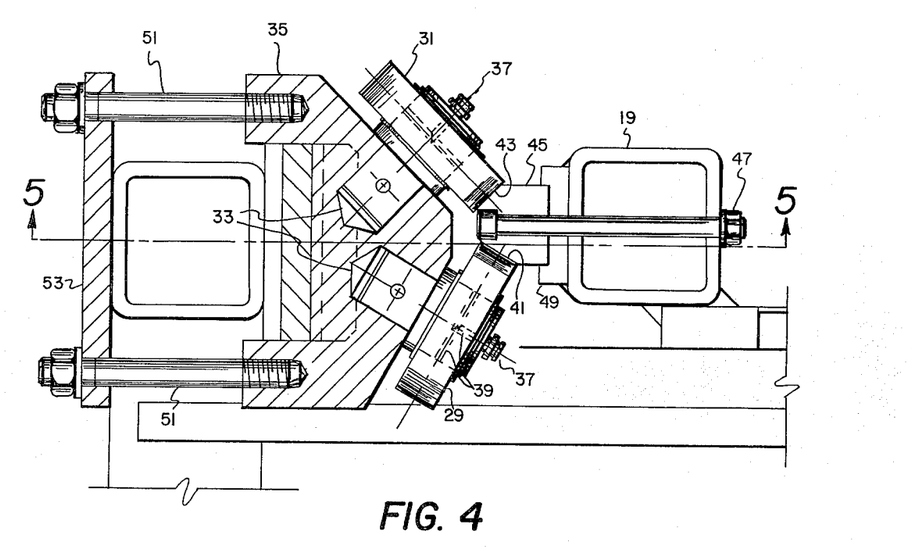
FIG. 4 is a longitudinal sectional view showing details of the ram bearings in accordance with the present invention.
Figure 5:
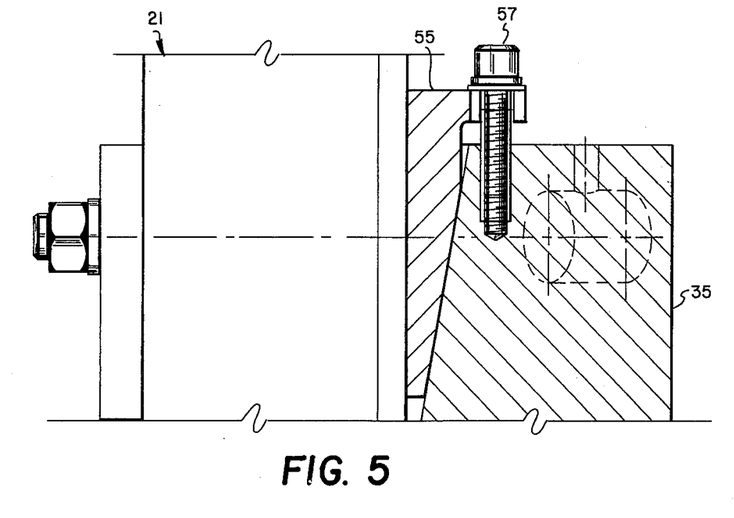
FIG. 5 is a sectional view along lines 5—5 in FIG. 4 showing an adjustment gib according to the present invention.

FIGS. 4 and 5 show in considerably more detail the arrangement and positioning of bearings 23 needed to cope with these stresses. In particular, bearings 23 are shown to be comprised of a lower weight-bearing roller 29 and an upper guide roller 31, each roller being mounted by means of an axle 33 on a bearing block 35. Each of axles 33 is provided with a grease fitting 37 which communicates through crossed glands 39 with the outer cylindrical surface of axle 33 to provide lubricant to each of rollers 29 and 31.

The outer cylindrical surfaces of each of rollers 29 and 31 engage a weight-bearing surface 41 and a guiding surface 43, respectively. As is apparent from FIG. 4, surfaces 41 and 43 are formed on a bearing rail 45 which extends longitudinally along the outer edge of ram 15, being removably attached to edge rail 19 by means of a plurality of bolts 47 which firmly retain bearing rail 45 within a mounting channel 49 welded along the outer edge of edge rail 19. However, surfaces 41 and 43 could also have been formed on an integral portion of ram 15 in the event that replacement of a worn bearing rail is not desired.

Weight-bearing roller 29 and guide roller 31 function as a pair to support the weight of ram 15 and to accurately guide its travel along ram bed 21. Accordingly, these rollers are provided in a total of eight pairs, four on each side of ram 15, mounted on a total of four bearing blocks 35, as is apparent in FIG. 3. However, the great weight of ram 15 would place a disproportionate amount of stress on the weight-bearing rollers in each of these pairs without special provisions to equalize the stresses.

In accordance with the present invention, a substantial equalization of stress between the rollers 29 and 31 can be achieved by a careful selection of the angles employed in forming bearing surfaces 41 and 43, and by a corresponding selection of the angles at which rollers 29 and 31 are mounted in bearing block 35. In particular, the force of gravity is directed downwardly in FIG. 4, while the predominant forces associated with the task of guiding ram 15 operate at a right angle to the gravity field.

Accordingly, since only lower weight-bearing roller 29 is positioned to resist gravitational forces, and will in any case have to withstand them, the bearing life of this roller and its associated surface 41 can be extended by positioning these elements such that surface 41 and the axis of rotation of roller 29 are closer to a position normal to the direction of gravity than would be the case if rollers 29 and 31 were arranged symmetrically about a horizontal plane.

The effect of this positioning of roller 29 and surface 41 is to lower the bearing force level which these two elements exert upon one another as a result of the weight of ram 15. This is true because the force exerted by surface 41 upon roller 29 acts in a direction normal to surface 41, while the component of this force in a vertical direction must equal the downward force of gravity upon ram 15, considering the collective contributions of all of rollers 29. The more nearly surface 41 approaches a horizontal plane, the larger will be the component of bearing force directed in a vertical direction, such that the total bearing force present will be reduced.

Bearing block 35 is mounted to ram bed 21 by means of bolts 51 passing through a clamping plate 53 and extending into block 35. In order to provide adjustment of the clearance between block 35 and ram 15 to provide substantially frictionless movement of ram 15 without excessive "slop", each block 35 is provided with a tapered gib 55 as shown in FIG. 5, a cross-sectional view of the plane defined by lines 5—5 in FIG. 4 as it would be seen when looking upwardly. Gib 55 is moved downwardly in FIG. 5 to move bearing block 35 closer to ram 15 by tightening an adjustment screw 57, and vice versa.

Although not shown in FIG. 5, a second gib and adjustment screw are provided at the other end of bearing block 35, below the cut-off line at the bottom of FIG. 5, such that the angle formed between block 35 and the adjacent portion of ram bed 21 can be adjusted to substantially zero, providing equal clearances between the two pairs of rollers on each block 35 and bearing rail 45.

Considering now FIGS. 2 and 6 together, details of the process of forming a continuous compacted sheet of fibrous matter will be explained. As ram 15 passes the outlet end of chute 7, it sweeps before it a small amount of the precompacted fibrous matter 3 which will be deposited in the space below the outlet of chute 7 by arcuate plungers 9 whenever ram 15 is withdrawn to the left in FIG. 2.

This small amount of fibrous matter is propelled by ram 15 toward a shearing blade 59 which, together with the vee-shaped nose of ram 15, shears from the semi-compacted mass of fiber a strip of fibrous matter having a height equal to the height of ram 15 at its nose. This strip of fibrous matter is then propelled beyond blade 59 to enter a forming tunnel 61 where it is forcibly compacted against the fibrous matter already present in tunnel 61 from previous passes of ram 15.

As ram 15 drives each successive small amount of compressed fibrous matter into tunnel 61, the material is added to compressed material already present in tunnel 61 from previous passes of ram 15. As a result, a continuous sheet of compacted fibrous matter flows "downstream" from the right end of forming tunnel 61 when the apparatus is in operation.

Forming tunnel 61 is bounded at top and bottom by gill plates 63 in which are formed a plurality of gills 65, each comprising a recess shaped to resist movement of the compacted matter in a direction toward blade 59 while permitting movement in the opposite direction. Gills 65 control the problem of "spring back", the tendency of fibrous matter compacted by ram 15 to expand toward chute 7 as soon as the ram is withdrawn. Although not shown, gills 65 may preferably be shaped such that they form patterns consisting of vees or chevrons lying in the plane of gill plates 63.

Figure 6:
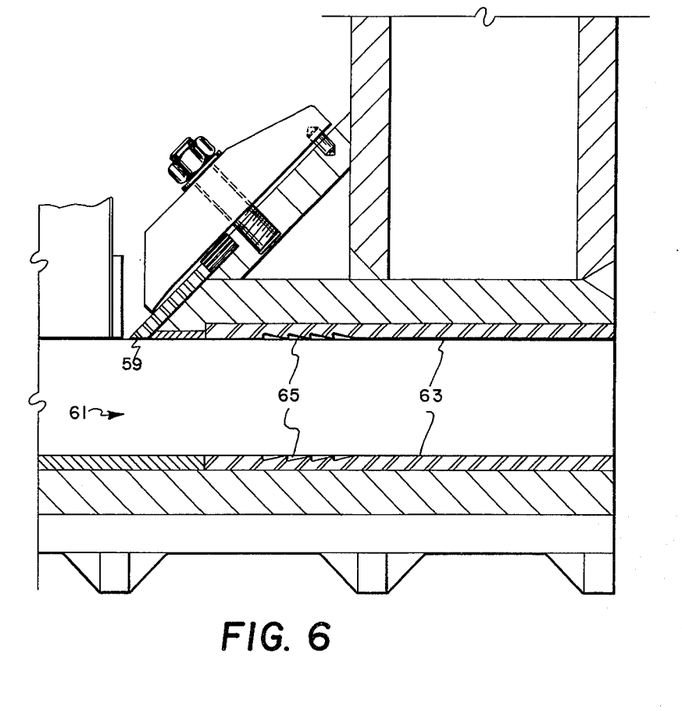
FIG. 6 is a side view in cross section of the portion of FIG. 1 enclosed by the arrow 6—6.

As the compacted sheet is formed and moves from forming tunnel 61, it next enters a sheet press 67, shown both in FIGS. 1 and 6. Within press 67, heat and pressure are applied to the surfaces of the compacted sheet, causing sufficient heating of the fibers to release some of their natural resins, and increasing the mechanical interlinking of individual fibers in the sheet. Each of these mechanisms contributes to both the dimensional stability and strength of the compacted sheet.

The compacted sheet, now thoroughly warmed and dimensionally stable moves into a surfacing station where it will be covered with a surfacing material bonded over all its surfaces with preferably a thermosetting resinous glue. This surfacing operation is carried out by passing the sheet between a supporting table 69 and an upper plate 71.

Plate 71 is supported above the planar surface of table 69 by means of a pantograph support 73 which constrains the movement of upper plate 71 such that its angular orientation with respect to the plane of supporting table 69 does not change. Thus, if upper plate 71 were initially aligned parallel to the plane of supporting table 69, and then raised from the surface of table 69 by an amount sufficient to accommodate the passage of the compacted sheet therebetween, plate 71 would remain parallel to the surface of table 69.

However, there are several reasons why the strict maintenance of parallelism is not desirable. As will appear from what follows, the principal functions of the upper surface of table 69 and the lower surface of the upper plate 71 are to apply heat and pressure to bond the surfacing material to the compacted sheet in a smooth, tightly adherent layer. Since the compacted sheet is continuously moving during this bonding, the pressure of plate 71 and table 69 on the sheet creates considerable frictional drag upon the moving sheet, and this drag must be overcome by ram 15 as it propels the sheet toward the surfacing operation.

Consequently, the drag is employed to selectively vary the speed of movement of the sheet slightly, such that with considerable drag and consequently slower movement, the density of compaction can be made higher in the production of sheet designed to support structural loads. Conversely, in the production of sheet designed to merely provide thermal insulation or acoustic absorption, the frictional drag can be lessened, causing faster movement of the sheet and accordingly less density of compaction and greater void space.

These effects are achieved simply by providing that upper plate 71 be slightly tiltable with respect to the plane of support table 69, in a sense to cause the gap between these two members to vary in the direction of travel of the sheet. Accordingly, if upper plate 71 has its right end (in FIGS. 6 and 7) tilted up slightly from a condition of absolute parallelism, the frictional drag is less, while with a downward tilt, the opposite effect ensues.

Figure 7:
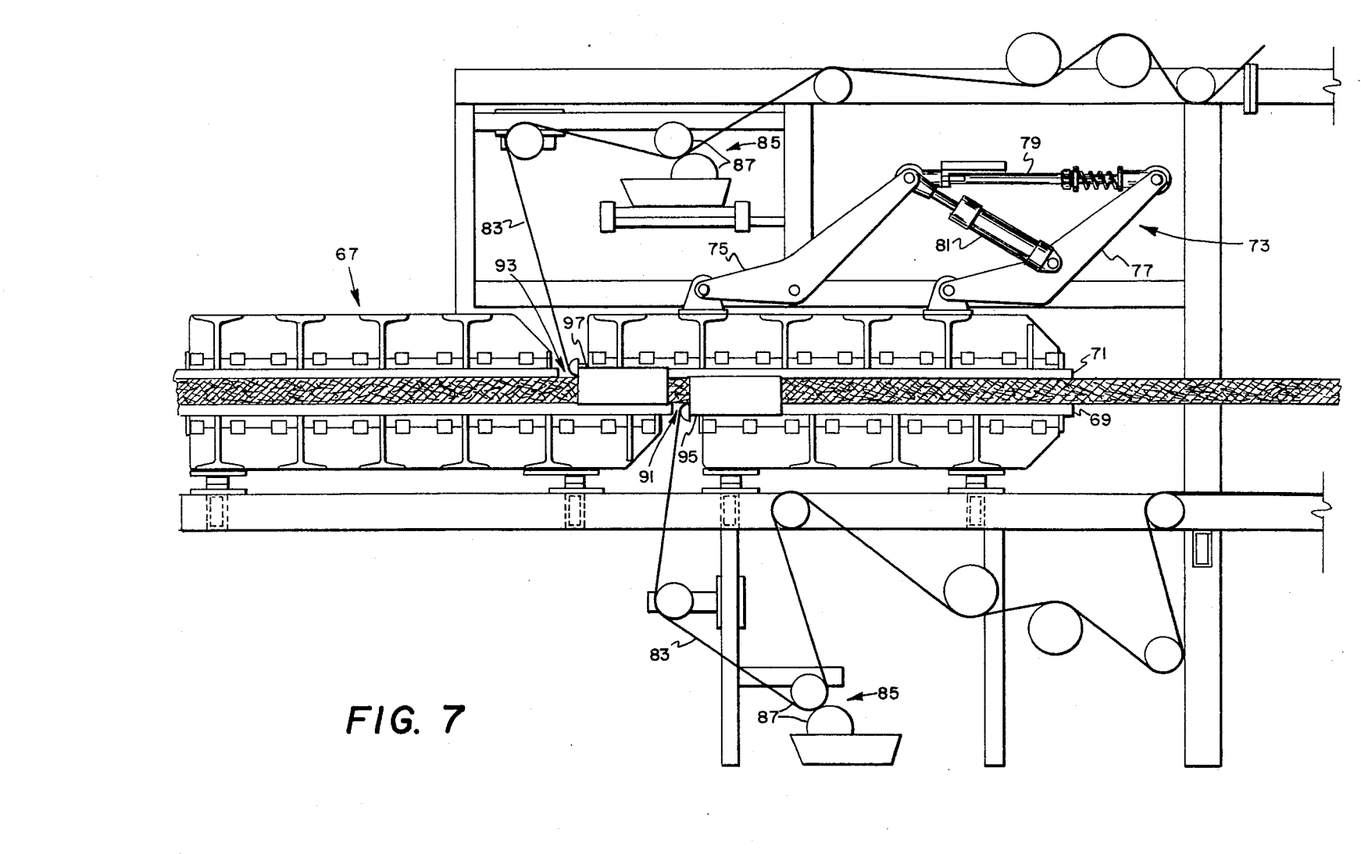
FIG. 7 is a side view partially in section showing details of the application of a surfacing material according to the present invention.

In order to accommodate these slight variations from parallelism, pantograph support 73 is provided with a means for adjustably fixing the angular positioning of the upper plate with respect to the plane of the supporting table in such a way as to cause the gap therebetween to vary along the direction of travel of the compacted sheet.

As will be noted from a study of FIG. 7, pantograph support 73 is formed of elbow arms 75 and 77, a connecting rod 79, and a hydraulic cylinder 81 for controlling and damping movement of upper plate 71. Each of elbow arms 75 and 77 is pivoted about an axis which is near its center and fixed to a stationary frame member 83. Similarly, each elbow arm is pivotally attached near its left end to upper plate 71, while the upper ends of elbow arms 75 and 77 are linked by rod 79 which is pivotally connected to each of the elbow arms. Arms 75 and 77 are geometrically identical except for the minor variance that arm 77 is provided with a pivoting attachment near its center for hydraulic cylinder 81.

So long as connecting rod 79 has the same length between its centers as the length between the central pivots of arms 75 and 77, upper plate 71 will be maintained parallel to supporting table 69 even though plate 71 is raised and lowered. However, connecting rod 79 is adjustable in length, and such adjustment can be used to vary the angle of upper plate 71 with respect to supporting table 69 for the purposes outlined above. In particular, if connecting rod 79 is shortened, the effect is to raise the left end of upper plate 71 with respect to the right end thereof. Similarly, if rod 79 is lengthened, the right end of plate 71 is raised with respect to the left end.

As shown in FIG. 7, surfacing material 83, which might be a heavy paper such as a gray liner paper up to 0.060 inch thick passes through a rather complex system of rollers on its travel from a source of such surfacing material to the points where it is applied to the upper and lower surfaces of the compacted sheet passing through the surfacing station. Surfacing material is supplied and applied separately to each of the upper and lower surfaces of the compacted sheet from totally separate sources of the material as will be covered later in this application.

Each of the sheets of surfacing material must have a layer of adhesive applied to it prior to its application to the compacted sheet, and for this purpose a pair of glue applicators 85 are used to coat the surface of material 83 to be bonded to the compacted sheet with a liquid adhesive, such as a thermosetting urea resin glue. Each of applicators 85 consists of a pair of rollers 87 between which the material 83 passes on its way to join the moving compacted sheet. One of this pair of rollers 87 rotates through a glue bath 89, such that it continuously picks up a coating of glue and consequently applies a thin layer of this glue to the surface of material 83.

A slot 91 extends transversely across the upper surface of supporting table 69 to permit the surfacing material which is to be bonded to the lower surface of the moving sheet to emerge into the sheet flow path. A similar slot 93 in upper plate 71 serves the same purpose with respect to the surfacing material to be applied to the upper surface of the compacted sheet.

The surfacing material 83 is supplied at a width sufficient to permit its being folded over and bonded to each of the edges of the compacted sheet, such that the resultant product is surfaced on all sides. Consequently, a pair of edge bonders 95 are provided on the edges of supporting table 69, although only one is visible in FIG. 7, the other one being located adjacent the opposite edge of the compacted sheet. Similarly, a pair of edge bonders 97 are provided on upper plate 71.

Each of bonders 95 and 97 is provided with a curved inner surface (not shown) which gradually folds the excess surfacing material 83 over the edge of the compacted sheet as the sheet moves past the bonder. Each bonder is also provided with an electrical heating element (not shown) to securely bond the fold-over edge of surfacing material to the edge of the compacted sheet.

Bonders 95 and 97, as shown in FIG. 7, are offset from each other in the direction of travel of the sheet product. The purpose of this offset is to permit the edges of one of the sheets of surfacing material (in FIG. 7, the upper sheet) to be folded over and bonded to the edges of the compacted sheet prior to the folding and bonding of the edges of the other sheet of surfacing material. Without this offset, the adequate design of the edge bonders would become more difficult, and the possibility of mechanical interference between the two edge portions of the surfacing material at the time of folding and bonding would be much greater.

Slots 91 and 93 are similarly offset from one another. However, this offset is dictated more by the requirement to provide an offset between edge bonders 95 and 97 than by any difficulty in simultaneously applying the upper and lower layers of surfacing material to the compacted sheet. The edge bonding is best accomplished concurrently with the bonding of the surfacing material to the faces of the sheet.

In practice, at least 12 inches of travel of the composite sheet product is required to achieve bonding of the first-applied layer (the upper layer in FIG. 7), after which the other layer is applied and bonded both to the surface and edges of the compacted sheet. Consequently, slot 91 must be located downstream from slot 93 by about 12 inches.

Returning now to FIG. 1, the aspects of the invention which relate to providing a continuous supply of surfacing material 83 will be described. Surfacing material 83 is supplied in the form of rather large, heavy discrete rolls 95 which are provided in separate areas above and below the compacted sheet path for surfacing the upper and lower faces of the sheet.

In feeding the surfacing material into the surfacing station, these rolls must naturally rotate as the surfacing material is consumed. Although a support means for the roll from which material is being fed could have been conceived in the form of a rotatable shaft passing through the center of the roll, such a design complicates the changing of the roll as its supply of surfacing material is exhausted.

In accordance with the present invention, the rolls 95 can be supported for rotation by a roller-cradle 97 which permits each roll to rotate about its axis in feeding the surfacing material, and also ensures that the roll is easily removed and replaced when exhausted without shutting down the apparatus. Roller cradle 97 is formed of two larger main feed rollers 99, between which are located two smaller main feed rollers 101, and an auxiliary roller 103.

In use, the roll 95 from which surfacing material is actually being fed into the apparatus is positioned within roller-cradle 97 and between the main feed rollers. An unused, full-diameter roll 95 will be supported by larger main feed rollers 99, whereas the same roll when partially exhausted will rest within the smaller cradle formed between smaller main feed rollers 101.

When this roll is very nearly exhausted, a fresh roll is brought up from a reservoir area to the right of the feeding area, and is positioned within the roller cradle formed between auxiliary roller 103 and the adjacent larger main feed roller 99. As the supply of surfacing material is exhausted on the current roll, the end of the surfacing material on this fresh roll is attached to the material being fed into the apparatus with an adhesive tape, the exhausted roll is removed, and the fresh roll is levered into position between the main feed rollers, all without shutting down the apparatus.

A pair of longitudinal rails 102, only one of which is visible in FIG. 1, serve not only as main structural elements of the entire apparatus, but also by being spaced apart correctly, as a convenient means for transporting a fresh roll into position for feeding surfacing material into the apparatus by the simple expedient of manually rolling the roll along rails 102.

Similarly, by providing that auxiliary roller 103 be mounted upon a pair of pivoting arms 100 (shown in phantom outline) roller 103 can be raised and lowered by means of a lever 104 to significantly aid in first positioning a fresh roll between rollers 103 and 99, and then shifting this roll to the cradle formed by the pair of main feed rollers 99.

Figure 8:
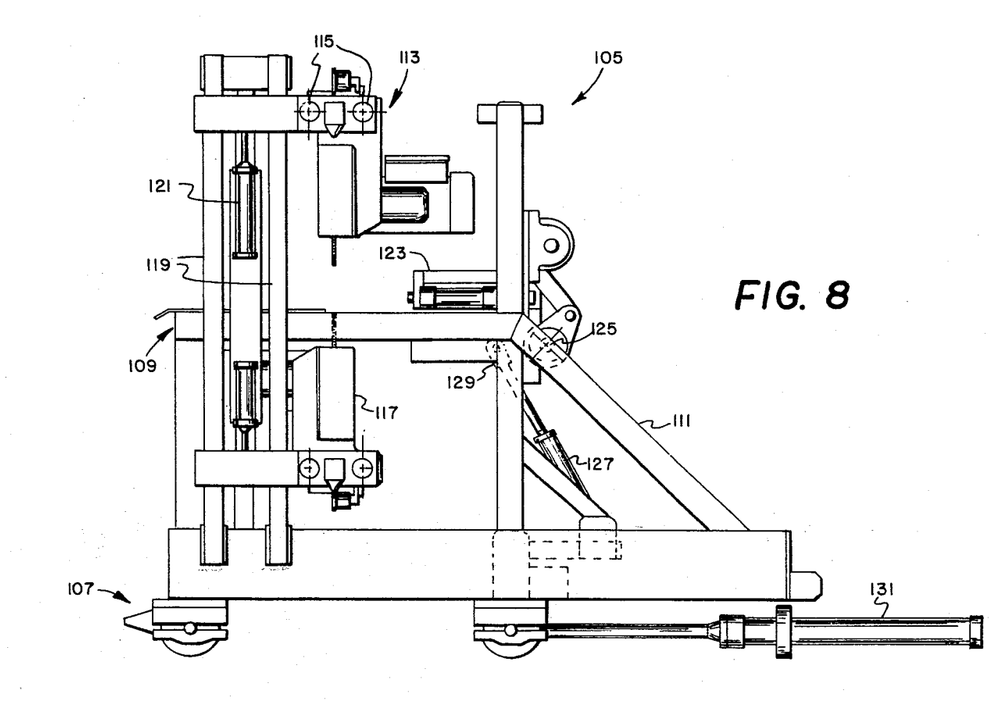
FIG. 8 is a schematic side view of the sawing and end-capping operations of the present invention.

Turning to FIG. 8, a cut-off and end sealer station 105 will be described. Station 105 is located "downstream" from the portions of the apparatus already considered, and would be located at the right end of the flow path illustrated in FIG. 1. Within station 105 are provided the means for cutting the continuous sheet of compacted fibrous material into standard lengths for use in the construction trade, and for sealing the cut ends with a bonded-on strip or cap of the same surfacing material used for finishing the other surfaces of the sheet. Thus, when finished, the entire board is covered with a bonded layer of a surfacing material such as one of the heavy papers mentioned earlier in this application.

Station 105 is basically formed as a rolling truck 107 having a support bed 109 at the same height as the other support surfaces located along the sheet flow path, and also having a pivoted bed extension 111 which will be mentioned later in connection with the end-capping operation. An upper motor-driven circular saw 113 is supported upon transversely extending ways 115 such that it can move across the sheet in the cutoff operation.

Similarly, a lower motor-driven saw 117 located below the bed 109 is supported for transverse movement to follow saw 113 closely during the cutting operation. Both saw 113 and saw 117 are vertically moved along a pair of vertical ways 119 by a dual-cylinder hydraulic actuator 121.

In operation, both saws move simultaneously toward the sheet to be cut, and once they have penetrated the sheet to the required cutting depth, they are moved simultaneously across the sheet to complete the cut. Although a single saw might seem adequate to perform this operation, in practice, the sheet is sometimes as much as 75 mm thick, and quite dense and resinous, such that the use of two saws which each cut only halfway through the sheet is a more workable arrangement. Since the sheet is continuously moving during the cutting operation at a speed of 2 to 3 cm per second, it is necessary for the saws to move with it, and for this purpose a plurality of hydraulically actuated edge clamps (not shown) temporarily lock the truck 107 to the sheet, such that both sheet and truck simultaneously move to the right in FIG. 8.

An end sealer 123 is employed to apply a narrow strip of surfacing material to the cut end of the sheet, as indicated above. A similar end sealer located "downstream" of station 105 and not shown in FIG. 8 performs the same operation on the other end of the cut-off section of sheet, thus forming it into a fully covered board for use in a variety of construction applications. Since each of the end sealers performs the same operation in an identical fashion, only sealer 123 will be discussed in what follows.

Sealer 123 is pivotally mounted about an axis 125, such that it can be raised into the position shown in FIG. 8 in order to perform the end-sealing operation, and can then be lowered out of the sheet flow path to permit the uncut sheet to pass over sealer 123 prior to being cut. For this purpose, a hydraulic cylinder 127 is provided with a clevis 129 attached to sealer 123, and by a suitable hydraulic control system (not shown), sealer 123 can be raised into sealing position only after a length of the sheet has been cut and moved into sealing position, past sealer 123.

Similarly, the same hydraulic control system sequentially raises and lowers table section 111, such that this section is raised only during the actual sealing operation, and is lowered at other times, such that the downstream sealer (not shown) can be brought quite close to saws 113 and 117 as would be necessary during the production of short (e.g., 4 foot) sections of finished board.

A hydraulic spreader cylinder 131 provides a preselected relative movement of the two sealers, and is controlled by the above-mentioned hydraulic control system in such a way that as soon as a section of sheet has been cut off, spreader cylinder advances the downstream sealer away from station 105, drawing the cut section of sheet, which is now clamped to the downstream sealer station, away from saws 113 and 117. The resultant movement is just sufficient to provide room for sealer 123 to be raised into sealing position, and to position the board correctly to permit sealer 123 to seal the cut end.

Although this invention has been described with some particularity in reference to a specific set of embodiments which, taken together, comprise the best mode known to the inventor for carrying out his invention, workers skilled in the art will realize that many modifications could be made, and many alternative embodiments could thus be derived without departing from the scope of the invention. Consequently, the scope of the invention is to be determined only from the following claims.

What is claimed is:

1. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, a precompacting feeder for supplying said fibrous waste matter at a substantially uniform precompacted density from a container of said fibrous matter, said precompacting feeder comprising:

chute means to define a flow path for conducting said fibrous matter from an inlet end at said container to an outlet end at said apparatus;

a plurality of reciprocating compactors speced apart along said flow path adjacent said chute outlet and for precompacting said fibrous matter, said compactors each including a retactile tip on the end thereof which will retract under pressure to reduce stress thereon, each of said compactors being reciprocally operable along an arcuate path of motion between a first position in which it is withdrawn from said flow path, and a second position in which it extends into said flow path, said path of motion being such that movement of said compactors from said first to second positions is in a direction to urge said fibrous matter toward said outlet end; and actuating means to cause said compactors to reciprocally move between said first and second positions to precompact said loose fibrous matter in said chute, and propel it into said apparatus.

2. The apparatus according to claim 1 wherein said reciprocating compactors comprise:

a plurality of reciprocating elongate plungers mounted spaced apart along said chute and oriented to project into said chute in a direction along said path of motion through a corresponding plurality of holes through a wall of said chute, said plungers moving from a position substantially withdrawn from the interior of said chute when in said first position, to a position within the interior of said chute when in said second position.

3. The apparatus according to claim 2 further comprising a plurality of pivotally mounted arms, each said arm being joined to an outer end of one of said plungers, said actuating means including means to cause each said arm to reciprocally move through a short arc, whereby each said plunger is caused to reciprocally move along an arcuate path of motion between said first and second positions.

4. The apparatus according to claim 2 wherein each of said plungers is provided at its inner end with a retractile, spring-loaded tip.

5. The apparatus according to claim 1 wherein said actuating means actuates at least one of said compactors asynchronously with another of said compactors.

6. The apparatus according to claim 5 wherein said compactors comprise a first, a second and a third compactor serially spaced apart in a direction axially along said flow path, and wherein said actuating means actuates said first and third compactors substantially in unison with one another, and actuates said second compactor in alternation with said first and third compactors.

7. The appartus according to claim 1 further including a compactor assembly comprising:
- a reciprocating ram, motive means for propelling said ram to and fro to perform said operations, and a ram bed for supporting and guiding the movements of said ram;
- bearing means on said ram and ram bed to support the weight of said ram on said bed, to guide the movement of said ram with respect to said bed, and to permit substantially frictionless traverse of said ram along said bed;
- said bearing means comprising a plurality of weight-bearing rollers on one of said ram and bed members, and a first longitudinally extending weight-bearing surface on the other of said ram and bed members at a first acute angle to the direction of the gravitational field, a plurality of guiding rollers on one of said ram and bed members, and a second longitudinally extending guiding surface on the other of said ram and bed members at a second acute angle to the direction of the gravitational field;
- said weight-bearing rollers being positioned to engage said weight-bearing surface when said ram is supported upon said bed, said guiding rollers being positioned to engage said guiding surface when said ram is supported upon said bed, said weight-bearing and guiding rollers being oriented with their axes substantially parallel to said weight-bearing and guiding surfaces, respectively, and said first acute angle being greater than said second acute angle.

8. The apparatus according to either claim 1 or 7 further including means for applying heat and pressure to a surface of said sheet following its formation, said means comprising:
- a supporting table having a generally planar upper surface generally aligned with the lower surface of said sheet as it emerges from said forming means;
- a generally planar upper plate generally in alignment with the upper surface of said sheet and said upper surface of said supporting table;
- pantograph support means for supporting said upper plate above said table and for constraining relative motion between said plate and table to movement along an axis substantially normal to the surface of said table.

9. The apparatus according to claim 8 further including means for applying an adherent surface layer to each of the faces and edges of said sheet, comprising:
- first layer applicator means for continuously, compressively applying to one of the faces of said compacted sheet a first adherent, flexible membranous sheet of surfacing material of a width greater than the width of said compacted sheet;
- second layer applicator means for continuously, compressively applying to the other of the faces of said compacted sheet a second adherent, flexible membranous sheet of surfacing material of a width greater than the width of said compacted sheet;
- first edge sealing means positioned downstream from said first layer applicator means for folding the excess width of said first membranous sheet over the edge of said compacted sheet and compressively adhering said membranous sheet along the edges of said compacted sheet;
- second edge sealing means positioned downstream from said second layer applicator means, and downstream from said first edge sealing means, for folding the excess width of said second membranous sheet over the edges of said compacted sheet and compressively applying said membranous sheet along the edges of said compacted sheet.

10. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, a compactor assembly comprising:
- a reciprocating ram, motive means for propelling said ram to and fro to perform said operations, and a ram bed for supporting and guiding the movements of said ram;
- bearing means on said ram and ram bed to support the weight of said ram on said bed, to guide the movement of said ram with respect to said bed, and to permit substantially frictionless traverse of said ram along said bed;
- said bearing means comprising a plurality of weight-bearing rollers on one of said ram and bed members, and a first longitudinally extending weight-bearing surface on the other of said ram and bed members at a first acute angle to the direction of the gravitational field, a plurality of guiding rollers on one of said ram and bed members, and a second longitudinally extending guiding surface on the other of said ram and bed members at a second acute angle to the direction of the gravitational field;
- said weight-bearing rollers being positioned to engage said weight-bearing surface when said ram is supported upon said bed, said guiding rollers being positioned to engage said guiding surface when said ram is supported upon said bed, said weight-bearing and guiding rollers being oriented with their axes substantially parallel to said weight-bearing and guiding surfaces, respectively, and said first acute angle being greater than said second acute angle.

11. The apparatus according to claim 10 wherein said ram is provided with a bearing rail attached to and extending along a lateral edge thereof, and wherein said bearing surfaces are formed on the laterally outer edge of said bearing rail in a vee array.

12. The apparatus according to claim 10 wherein one of said bearing rollers are one of said guiding rollers are commonly affixed to a bearing block, said bearing block being mounted on one of said ram and bed members, and further including means for adjusting the position of said block in a direction transverse to the axis of movement of said ram to control clearance between said bearing surfaces and rollers.

13. The apparatus of claim 12 wherein said adjusting means comprises a wedge-shaped gib.

14. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, means for applying heat and pressure to a surface of said sheet following its formation, said means comprising:

a supporting table having a generally planar upper surface generally aligned with the lower surface of said sheet as it emerges from said forming means;

a generally planar upper plate generally in alignment with the upper surface of said sheet and said upper surface of said supporting table, wherein said continuous compacted sheet flows in a longitudinal direction between said supporting table and said upper plate;

pantograph support means for supporting said upper plate above said table and for constraining relative motion between said plate and table to movement along an axis substantially normal to the surface of said table, said pantograph support means including means for adjustably fixing the angular positioning of said upper plate with respect to said supporting table upper surface to selectively adjust the drag on said continuously compacted sheet flowing therebetween by causing the gap between said plate and upper surface to vary along said longitudinal direction of flow.

15. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, means for applying an adherent surface layer to each of the faces and edges of said sheet, comprising:

first layer applicator means for continuously, compressively applying to one of the faces of said compacted sheet a first adherent, flexible membranous sheet of surfacing material of a width greater than the width of said compacted sheet;

second layer applicator means for continuously, compressively applying to the other of the faces of said compacted sheet a second adherent, flexible membranous sheet of surfacing material of a width greater than the width of said compacted sheet;

first edge sealing means positioned downstream from said first layer applicator means for folding the excess width of said first membranous sheet over the edge of said compacted sheet and compressively adhering said membranous sheet along the edges of said compacted sheet;

second edge sealing means positioned downstream from said second layer applicator means, and downstream from said first edge sealing means, for folding the excess width of said second membranous sheet over the edges of said compacted sheet and compressively applying said membraneous sheet along the edges of said compacted sheet;

a supporting table having a generally planar upper surface generally aligned with the lower surface of said sheet as it emerges from said forming means;

a generally planar upper plate generally in alignment with the upper surface of said sheet and said upper surface of said supporting table, wherein said sheet flows between said table and said plate;

each of said table and upper plate being provided with a transversely extending slot in the surface thereof facing said sheet as it passes between said table and plate;

each of said table and upper plate being provided with means to dispense through said slots a continuous layer of said surfacing material as said sheet passes therebetween;

means to vary the spacing between said upper plate and table to continuously, compressively apply said surfacing material to the upper and lower surfaces of said sheet, and, said pantograph support means including means for adjustably fixing the angular positioning of said upper plate with respect to said supporting table upper surface to selectively adjust the drag on said continuously compacted sheet flowing therebetween by causing the gap between said plate and upper surface to vary along said longitudinal direction of flow.

16. The apparatus of claim 15 further including glue applicator means in each of said table and upper plate to apply a layer of adhesive to each said layer of surfacing material prior to its emergence from said slots.

17. The apparatus of claim 16 wherein said glue applicator means applies a thermosetting resinous glue, and wherein said table, upper plate and first and second edge sealing means each include heater means to heat said glue to cause bonding of said surfacing material and sheet.

18. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, means for continuously supplying flexible, membranous surfacing material during the operation of said apparatus from a plurality of discrete rolls of said material, comprising:

a surfacing material feeding means for supporting a pair of said rolls, for permitting rotation of either of said rolls as said surfacing material is fed into said apparatus, and for conducting said surfacing material from either of said rolls into said apparatus for use in surfacing:

reservoir means for maintaining as plurality of rolls of said surfacing material in ready reserve as the surfacing material at said feeding means is consumed;

roll transport means for transporting a fresh roll of surfacing material from said reservoir to said feeding means when needed, a supporting table having a generally planar upper surface generally aligned with the lower surface of said sheet as it emerges from said forming means;

a generally planar upper plate generally in alignment with the upper surface of said sheet and said upper surface of said supporting table, wherein said sheet flows between said table and said plate;

pantograph support means for supporting said upper plate above said table and for constraining relative motion between said plate and table to movement along an axis substantially normal to the surface of said table, said pantograph support means including means for adjustably fixing the angular positioning of said upper plate with respect to said supporting table upper surface to selectively adjust the drag on said continuously compacted sheet flowing therebetween by causing the gap between said plate and upper surface to vary along said longitudinal direction of flow.

19. The apparatus of claim 18 wherein said surfacing material feeding means comprises roller-cradle means for supporting said pair of rolls in immediately adjacent side-by-side relation, and for permitting substantially frictionless rotation of either of said pair of rolls as said surfacing material is consumed.

20. The apparatus of claim 19 wherein said roller-cradle means comprises a pair of support rollers positioned mutually parallel, spaced from one another by an amount less than the diameter of a consumed roll of said surfacing material, and oriented transverse to the direction of conducting said surfacing material into said apparatus.

21. The apparatus of claim 19 wherein said roll transport means comprises lifting means for lifting said fresh roll onto said roller-cradle means.

22. The apparatus of claim 18 further including a precompacting feeder for supplying said fibrous waste matter at a substantially uniform precompacted density from a container of said fibrous matter, said precompacting feeder comprising:
  chute means to define a flow path for conducting said fibrous matter from an inlet end at said container to an outlet end at said apparatus;
  a plurality of reciprocating compactors spaced apart along said flow path adjacent said chute outlet end for precompacting said fibrous matter, each of said compactors being reciprocally operable along a path of motion between a first position in which it is withdrawn from said flow path, and a second position in which it extends into said flow path, said path of motion being such that movement of said compactors from said first to second positions is in a direction to urge said fibrous matter toward said outlet end;
  actuating means to cause said compactors to reciprocally move between said first and second positions to precompact said loose fibrous matter in said chute, and propel it into said apparatus.

23. The apparatus according to either claim 18 or 22 further including a compactor assembly comprising:
  a reciprocating ram, motive means for propelling said ram to and fro to perform said operations, and a ram bed for supporting and guiding the movements of said ram;
  bearing means on said ram and ram bed to support the weight of said ram on said bed, to guide the movement of said ram with respect to said bed, and to permit substantially frictionless traverse of said ram along said bed;
  said bearing means comprising a plurality of weight-bearing rollers on one of said ram and bed members, and a first longitudinally extending weight-bearing surface on the other of said ram and bed members at a first acute angle to the direction of the gravitational field, a plurality of guiding rollers on one of said ram and bed members, and a second longitudinally extending guiding surface on the other of said ram and bed members at a second acute angle to the direction of the gravitional field; said weight-bearing rollers being positioned to engage said weight-bearing surface when said ram is supported upon said bed, said guiding rollers being positioned to engage said guiding surface when said ram is supported upon said bed, said weight-bearing and guiding rollers being oriented with their axes substantially parallel to said weight-bearing and guiding surfaces, respectively, and said first acute angle being greater than said second acute angle.

24. The apparatus according to claim 23 further including means for applying heat and pressure to a surface of said sheet following its formation, said means comprising:
  a supporting table having a generally planar upper surface generally aligned with the lower surface of said sheet on it emerges from said forming means;
  a generally planar upper plate generally in alignment with the upper surface of said sheet and said upper surface of said supporting table;
  pantograph support means for supporting said upper plate above said table and for constraining relative motion between said plate and table to movement along an axis substantially normal to the surface of said table.

25. The apparatus according to claim 23 further including means for applying an adherent surface layer to each of the faces and edges of said sheet, comprising:
  first layer applicator means for continuously, compressively applying to one of the faces of said compacted sheet a first adherent, flexible membranous sheet of surfacing material of a width greater than the width of said compacted sheet;
  second layer applicator means for continuously, compressively applying to the other of the faces of said compacted sheet a second adherent, flexible membranous sheet of surfacing material of a width greater than the width of said compacted sheet;
  first edge sealing means positioned downstream from said first layer applicator means for folding the excess width of said first membranous sheet over the edge of said compacted sheet and compressively adhering said membranous sheet along the edges of said compacted sheet;
  second edge sealing means positioned downstream from said second layer applicator means, and downstream from said first edge sealing means, for folding the excess width of said second membranous sheet over the edges of said compacted sheet and compressively applying said membranous sheet along the edges of said compacted sheet.

26. In an apparatus for forming generally loose fibrous waste matter into a uniformly compacted sheet by the technique of separating a certain volume of the fibrous matter from the remainder thereof, compacting the matter so seperated and ramming it through a forming means, and repeating the separating, compacting and ramming operations to form a continuous compacted sheet flowing from the forming means, a precompacting feeder for supplying said fibrous waste matter at a substantially uniform precompacted density from a container of said fibrous matter, said precompacting feeder comprising:
  chute means to define a flow path for conducting said fibrous matter from an inlet end at said container to an outlet end at said apparatus;
  a plurality of reciprocating compactors spaced apart along said flow path adjacent said chute outlet end for precompacting said fibrous matter, each of said compactors being reciprocally operable along a path of motion between a first position in which it is withdrawn from said flow path, and a second position in which it extends into said flow path, said path of motion being such that movement of said compactors from said first to second positions is in a direction to urge said fibrous matter toward said outlet end;

actuating means to cause said compactors to reciprocally move between said first and second positions to precompact said loose fibrous matter in said chute, and propel it into said apparatus; and said reciprocating compactors including a plurality of reciprocating elongate plungers mounted spaced apart along said chute and oriented to project into said chute in a direction along said path of motion through a corresponding plurality of holes through a wall of said chute, said plungers moving from a position substantially withdrawn from the interior of said chute when in said first position, to a position within the interior of said chute when in said second position, wherein each of said plungers is provided at its inner end with a retractile, spring-loaded tip.

27. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, a precompacting feeder for supplying said fibrous waste matter at a substantially uniform precompacted density from a container of said fibrous matter, said precompacting feeder comprising:

chute means to define a flow path for conducting said fibrous matter from an inlet end at said container to an outlet end at said apparatus;

a plurality of reciprocating compactors spaced apart along said flow path adjacent said chute outlet end for precompacting said fibrous matter, said compactors including a first, a second and a third compactor serially spaced apart in a direction axially along said flow path, each of said compactors being reciprocally operable along a path of motion between a first position in which it is withdrawn from said flow path, and a second position in which it extends into said flow path, said path of motion being such that movement of said compactors from said first to second positions is in a direction to urge said fibrous matter toward said outlet end, and wherein said actuating means actuates said first and third compactors substantially in unision with one another, and actuates said second compactor in alternation with said first and third compactors;

actuating means to cause said compactors to reiprocally move between said first and second positions to precompact said loose fibrous matter in said chute, and propel it into said apparatus, said actuating means actuating at least one of said compactors asynchronously with another of said compactors.

28. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, a precompacting feeder for supplying said fibrous waste matter at a substantially uniform precompacted density from a container of said fibrous matter, said precompacting feeder comprising:

chute means to define a flow path for conducting said fibrous matter from an inlet end at said container to an outlet end at said apparatus;

a plurality of reciprocating compactors spaced apart along said flow path adjacent said chute outlet end for precompacting said fibrous matter, each of said compactors being reciprocally operable along a path of motion between a first position in which it is withdrawn from said flow path, and a second position in which it extends into said flow path, said path of motion being such that movement of said compactors from said first to second positions is in a direction to urge said fibrous matter toward said outlet end;

actuating means to cause said compactors to reciprocally move between said first and second positions to precompact said loose fibrous matter in said chute, and propel it into said apparatus;

and said apparatus further comprising a compactor assembly including a reciprocating ram, motive means for propelling said ram to and fro to perform said operations, and a ram bed for supporting and guiding the movements of said ram;

bearing means on said ram and ram bed to support the weight of said ram on said bed, to guide the movement of said ram with respect to said bed, and to permit substantially frictionless traverse of said ram along said bed;

said bearing means comprising a plurality of weight-bearing rollers on one of said ram and bed members, and a first longitudinally extending weight-bearing surface on the other of said ram and bed members at a first acute angle in the direction of the gravitational field, a plurality of guiding rollers on one of said ram and bed members, and a second longitudinally extending guiding surface on the other of said ram and bed members at a second acute angle to the direction of the gravitional field;

said weight-bearing rollers being positioned to engage said weight-bearing surface when said ram is supported upon said bed, said guiding rollers being positioned to engage said guiding surface when said ram is supported upon said bed, said weight-bearing and guiding rollers being oriented with their axes substantially parallel to said weight-bearing and guiding surfaces, respectively, and said first acute angle being greater than said second acute angle.

29. In an apparatus for forming generally loose fibrous waste matter into a uniformly compacted sheet by the technique of separating a certain volume of the fibrous matter from the remainder thereof, compacting the matter so separated and ramming it through a forming means, and repeating the separating, compacting and ramming operations to form a continuous compacted sheet flowing from the forming means, means for continuously supplying flexible, membranous surfacing material during the operation of said apparatus from a plurality of discrete rolls of said material, comprising:

a surfacing material feeding means for supporting a pair of said rolls, for permitting rotation of either said rolls as said surfacing material is fed into said apparatus, and for conducting said surfacing material from either of said rolls into said apparatus for use in surfacing:

reservoir means for maintaining a plurality of rolls of said surfacing material in ready reserve as the surfacing material at said feeding means is consumed;

roll transport means for transporting a fresh roll of surfacing material from said reservoir to said feeding means when needed;

said apparatus further comprising a compactor assembly, including a reciprocating ram, motive means for propelling said ram to and fro to perform said operations, and a ram bed for supporting and guiding the movements of said ram;

bearing means on said ram and ram bed to support the weight of said ram on said bed, to guide the movement of said ram with respect to said bed, and to permit substantially frictionless traverse of said ram along said bed;

said bearing means comprising a plurality of weight-bearing rollers on one of said ram and bed membes, and a first longitudinally extending weight-bearing surface on the other of said ram and bed members at a first acute angle to the direction of the gravitational field, a plurality of guiding rollers on one of said ram and bed members, and a second longitudinally extending guiding surface on the other of said ram and bed members at a second acute angle to the direction of the gravitional field;

said weight-bearing rollers being positioned to engage said weight-bearing surface when said ram is supported upon said bed, said guiding rollers being positioned to engage said guiding surface when said ram is supported upon said bed, said weight-bearing and guiding rollers being oriented with their axes substantially parallel to said weight-bearing and guiding surfaces, respectively, and said first acute angle being greater than said second acute angle.

* * * * *